US009026836B2

(12) United States Patent
Brunson et al.

(10) Patent No.: US 9,026,836 B2
(45) Date of Patent: May 5, 2015

(54) CALL RESTORATION IN RESPONSE TO APPLICATION FAILURE

(75) Inventors: Gordon R. Brunson, Broomfield, CO (US); Mehmet C. Balasaygun, Freehold, NJ (US); Harsh V. Mendiratta, East Brunswick, NJ (US)

(73) Assignee: Avaya Inc., Basking Ridge, NJ (US)

( * ) Notice: Subject to any disclaimer, the term of this patent is extended or adjusted under 35 U.S.C. 154(b) by 353 days.

(21) Appl. No.: 13/476,789

(22) Filed: May 21, 2012

(65) Prior Publication Data

US 2013/0311825 A1 Nov. 21, 2013

(51) Int. Cl.
*H04L 29/06* (2006.01)
*H04L 29/14* (2006.01)

(52) U.S. Cl.
CPC ........ *H04L 65/1063* (2013.01); *H04L 65/1083* (2013.01); *H04L 65/1096* (2013.01); *H04L 69/40* (2013.01)

(58) Field of Classification Search
CPC ............ H04L 65/1006; H04L 65/1069; H04L 65/105
USPC ......................................................... 714/4.1
See application file for complete search history.

(56) References Cited

U.S. PATENT DOCUMENTS

2007/0220302 A1* 9/2007 Cline et al. ........................ 714/4
2010/0121980 A1 5/2010 Hoeflin et al.
2010/0299551 A1* 11/2010 Han et al. ......................... 714/4

FOREIGN PATENT DOCUMENTS

EP 2111015 10/2009

OTHER PUBLICATIONS

Rosenberg, et al., RFC 3261, "SIP: Session Initiation Protocol", Jun. 2002, 4 pages.
Singh et al. "Failover, load sharing and server architecture in SIP telephony," Computer Communications, Feb. 20, 2007, vol. 30, No. 5, pp. 927-942.
Extended Search Report for European Patent Application No. 12185548.0, dated Aug. 19, 2013 7 pages.

* cited by examiner

*Primary Examiner* — Jigar Patel
(74) *Attorney, Agent, or Firm* — Sheridan Ross P.C.

(57) ABSTRACT

A communication system, method, and components are described. Specifically, the method described herein provides the ability for an application sequence of a communication session to be reconstructed during the communication session and even though SIP standards dictate that the reconstruction of the application sequence should be denied and the session should be terminated.

20 Claims, 6 Drawing Sheets

CALL RESTORATION IN RESPONSE TO APPLICATION FAILURE

FIELD OF THE DISCLOSURE

The present disclosure is generally directed toward communications and more specifically toward communication restoration and preservation.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Many SIP communication sessions are enhanced by virtue of the fact that an application is inserted or included into the communication session during the establishment of that session. The incorporation of applications into a communication session is typically referred to as application sequencing because the applications are sequentially invoked during the establishment of the communication session. In some instances the applications are owned and operated by an enterprise that is administering the SIP network. In some instances, the applications may be provided by third-party vendors. In either event, the traditional way in which applications are included in the communication session is during the communication session establishment stage so that these applications can insert themselves into the signaling and media path of the communication session.

Exemplary types of applications that may be utilized for a communication session include, without limitation, call recording applications, communication log services, conferencing applications, security applications, encryption applications, collaboration applications, whiteboard applications, mobility applications, presence applications, media applications, messaging applications, bridging applications, and any other type of application that can supplement or enhance communications.

In an architecture adhering to SIP standards (e.g., as defined in RFC 3261, the entire contents of which are hereby incorporated herein by reference), a chain of sequenced applications may be established for the communication session. In a chain of sequenced applications, the entire sequence fails according to SIP standards if a single application in the sequence fails at any time during a communication session. The problem is analogous to a string of Christmas lights that go out if a single bulb goes out. Specifically, the overall fail rate for a sequence of applications is the sum total of each server's fail rate in the application sequence.

For example, if a user has an application sequence that includes a call recording application and that application fails during the communication session, it would be desirable to restore signaling without re-building the entire application sequence.

SUMMARY

It is with respect to the above issues and other problems that the embodiments presented herein were contemplated. In particular, embodiments of the present disclosure resolve one or more applications in an application sequence to a domain name. When an instance of an application is desired, the mechanism that sets up the application sequence can use the domain name and the application that is sequenced into the signaling path is one of multiple application instances associated with the same domain name. In other words, multiple redundant instances of a single application (e.g., an application cluster) are associated with a single domain name and any one of the applications in the application cluster are capable of providing the requested application service(s).

When one of the applications in the application cluster is inserted into an application sequence, it takes on a fixed position with regards to its upstream and downstream neighboring applications. Certain dialog information associated with the session is shared with the upstream and downstream neighbors. These other applications (e.g., the upstream and downstream neighboring applications) in the stream will maintain this information until the communication session is torn down (e.g., until each application receives a BYE message).

If the initially-selected application fails during a communication session, the upstream and downstream neighboring applications will attempt to re-establish the former connection, but sequencing mechanism may select another server instance to replace the failed application in the stream. According to the SIP standard, this re-establishment should be immediately rejected because it references a non-existing state in the new application instance, which means if the SIP standard were followed, then the entire signaling path would be torn down and the application sequence would be re-established from scratch. This re-establishment is often either unsuccessful or highly disruptive to the session participants.

According to embodiments of the present disclosure, however, as long as each neighbor sends a re-establishment message (e.g. any SIP message) with references to the original session and/or dialog identifiers, the newly-selected application instance can treat the request as valid and begin establishing a replacement context whose ongoing behavior supports the reconstructed session. Accordingly, the new application can step in quickly without requiring a complete end-to-end session re-establishment. This greatly increases the robustness of a communication session that has multiple applications in an application sequence.

In accordance with at least some embodiments of the present disclosure, a method is provided which generally comprises:

determining that an application in an application sequence has failed during a communication session that is associated with the application sequence;

sending a re-establishment message to a replacement application, the re-establishment message referencing at least one of an original session and original dialog identifier of the communication session; and reconstructing the application sequence to include the replacement application, wherein the application sequence is reconstructed without requiring the application sequence to be torn down.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
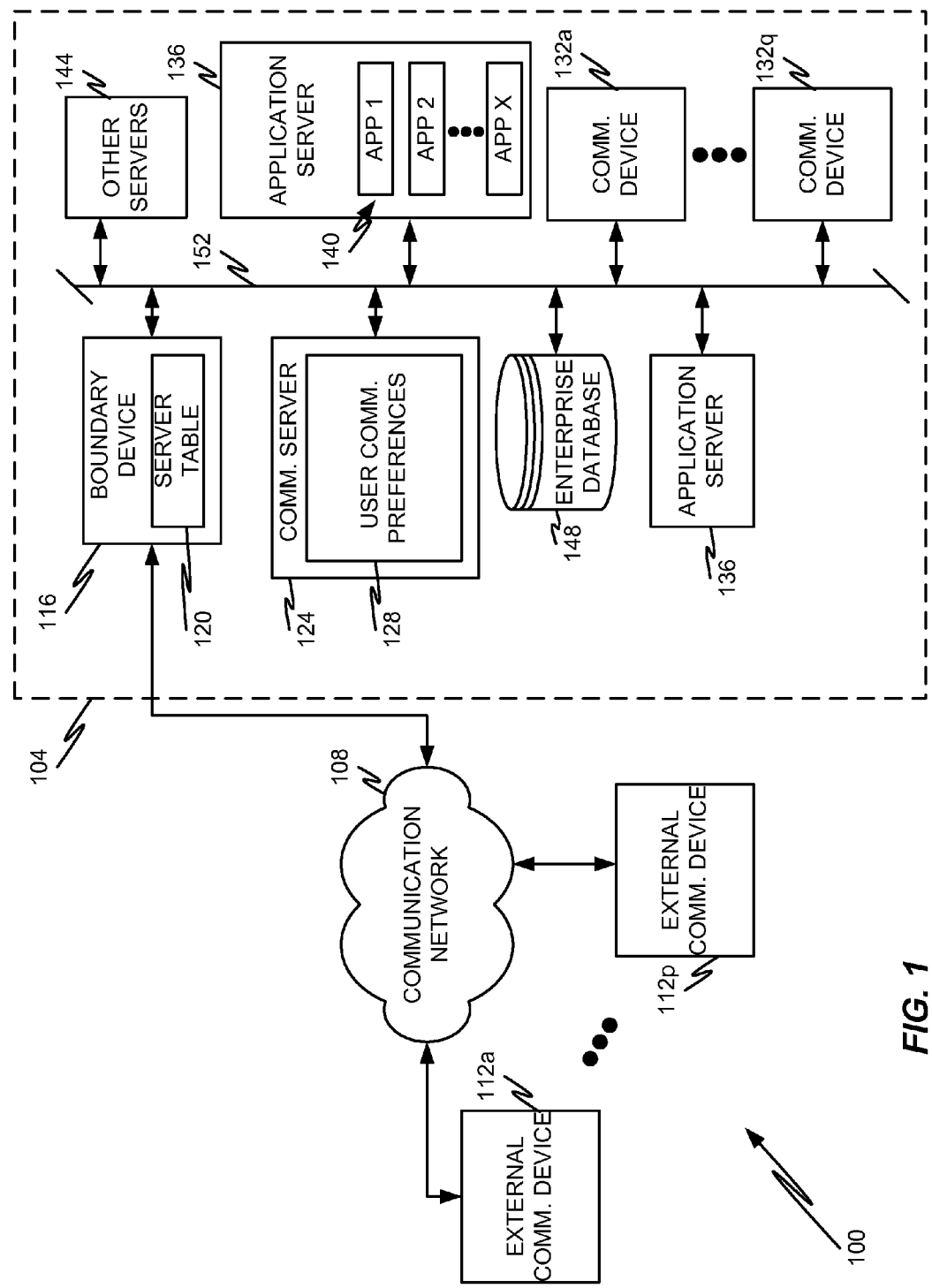
FIG. 1 is a block diagram of a communication system in accordance with embodiments of the present disclosure.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112a-p. The external communication devices 112a-p are generally referred to as "external" because they are either not under the direct control of the enterprise administering the enterprise network 104 or have a decreased level of trust with the enterprise network 104 as compared with communication devices 132a-q that are within the enterprise network 104. Exemplary types of external communication devices 112a-p include, without limitation, cellular phones, smartphones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, an IP Multimedia Subsystem (IMS) network, a SIP network, a Voice over IP (VoIP) network, or combinations thereof. In one configuration, the communication network 108 is a public network supporting the TCP/IP suite of protocols.

The enterprise network 104 may include a boundary device 116 including a server table 120, a communication server 124 including a set of user communication preferences 128, one or more internal communication devices 132a-q, one or more application servers 136 which may be capable of providing one application 136 or a set of different applications 140, a number of other servers 140, and an enterprise database 148, all of which are interconnected by a (trusted or secure or private) Local Area Network (LAN) 152. Some or all of the functions depicted in FIG. 1 may be co-hosted and/or co-resident on a single server. The depiction of components in FIG. 1 is generally intended to be a logical depiction of the components of the system 100. It should be appreciated that an enterprise network 104 may comprise multiple LANs, 152, connected via a WAN, such as the communication network 108. A single enterprise communication network 104 is depicted and described herein for ease of understanding and simplicity and in no way is intended to limit embodiments of the present invention to a single enterprise network 104.

The LAN 152 can be secured from intrusion by untrusted parties by a gateway and/or firewall located between the LAN 152 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of applications made available via Avaya Aura™ platform of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 124 is depicted in FIG. 1, two or more communications servers 124 may be provided in a single enterprise network 104 or across multiple separate LANs, 152, owned and operated by a single enterprise, but separated by communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and service a first subset of enterprise users whereas a second communications server 124 may be authoritative for and service a second subset of enterprise users, where the first and second subsets of users generally do not share a common user. This is one reason why the network boundary device 116 may be provided with a server table 120—the server table 120 may comprise the information that maps a user to their authoritative communication server 124.

Additionally, multiple servers 124 can support a common user community. For example, in geo-redundant and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104. In some embodiments, the network boundary device may include functionality similar to a Session Border Controller (SBC), a firewall, gateway, or any other device that provides security and/or translation capabilities.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 132) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but this is not necessarily required. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 may include feature sequencing functionality that implements the user communication preferences 128. The user communication preferences 128 for a communication server 124 contains the communication preferences for each user for which it is authoritative. In particular, the communication preferences 128 may be in any type of format, for example a table format, and may be provisioned by users and/or by administrative personnel. The communications preferences 128 for a particular user are referenced by the feature sequencing functionality of the communication server 124 to determine which, if any, features (e.g., applications 136, 140) should be incorporated into a communication session for the user. The feature sequencing functionality can actually provide communication features directly into the communication session or determine an application sequence that will be invoked during set-up and used during the communication session.

In accordance with at least some embodiments, the communication server 124 can determine an application sequence and cause one or more applications 136, 140 to be sequenced into a communication session. In particular, the communication server 124 is configured to analyze a particular user's communication preferences and invoke the necessary applications to fulfill such preferences. Once an application sequence is determined, the communications server 124 passes the communication-establishing message (e.g., an INVITE message) to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the communication server 124 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, this process continues until all applications have been included in the communication session and the process can be duplicated for each of the users involved in the communication session.

Although only two application servers 136 are depicted, one skilled in the art will appreciate the one, two, three, or more applications servers 136 can be provided and each server may be configured to provide one or more applications. The applications provided by a particular application server 136 may vary depending upon the capabilities of the server 136 and, in the event that a particular application server 136 comprises a set of applications 140, one, some, or all of the applications in that set of applications 140 may be included in a particular application sequence. There is no requirement, however, that all applications in a set of applications 140 be included in an application sequence and there is no requirement as to the order in which applications are included in the application sequence. Rather, the application sequence is usually determined based on user communication preferences 128. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's communication preferences and to provide communication services in accordance therewith. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

In accordance with at least some embodiments of the present disclosure, two or more applications 136, 140 may be part of an application cluster and may be referenced via a common logical name (e.g., a common domain name or IP address). When the communication server 124 determines that a single instance of an application is desired for an application sequence, the communication server 124 may use the common logical name to route the call-establishing message to the application cluster and one of multiple application instances in that cluster are sequenced into the signaling path for the communication session. In other words, multiple redundant instances of a single application can be associated with a single common logical name and any one of the applications in that group can be capable of providing the desired application service.

In some embodiments, applications 136, 140 can be inserted into the signaling path of the communication session for determining state information about the communication session and/or for controlling aspects of the communication session. In particular, an application instance can be inserted into an application sequence as a Back-to-Back User Agent (B2BUA) and can behave as such for the duration of the communication session. Because one or more applications in an application sequence may behave as a B2BUA, embodiments of the present disclosure provide mechanisms for recovering from a failure of one application in the application sequence. Otherwise, the dialog of the communication session would have to be torn down in response to a single application failing.

The other servers 144 may comprise email servers, voicemail servers, calendaring servers, conferencing servers, presence servers, and other types of servers known to provide particular services to client devices. In some embodiments, the other servers 144 may also be considered application servers 136, which provide one or more applications for use in a communication session.

The internal communication devices 132*a-q* can be similar or identical to the external communication devices 112*a-p*, except they are provisioned, and often owned, by the enterprise. Exemplary types of communication devices 112, 132 include, without limitation, any capable phone, softphone and/or digital telephone. Examples of suitable telephones include the 1600 ™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 148 includes enterprise subscriber information, such as name, job title, electronic address information (e.g., telephone number, email address, instant messaging handle, direct dial extension, and the like), subscriber contact lists (e.g., contact name and electronic address information), other employee records, and the like.

The various servers and components depicted in FIG. 1 may be implemented separately (i.e., on different servers) or together (i.e., on a single server). In particular, two or more depicted components (e.g., communication server 124 and application server 136) may be implemented on a single server without departing from the scope of the present invention. Thus, a single device may provide the functionality of several components depicted separately in FIG. 1. As another example, the boundary device 116 and communication server 124 may be implemented on a single device.

Figure 2:
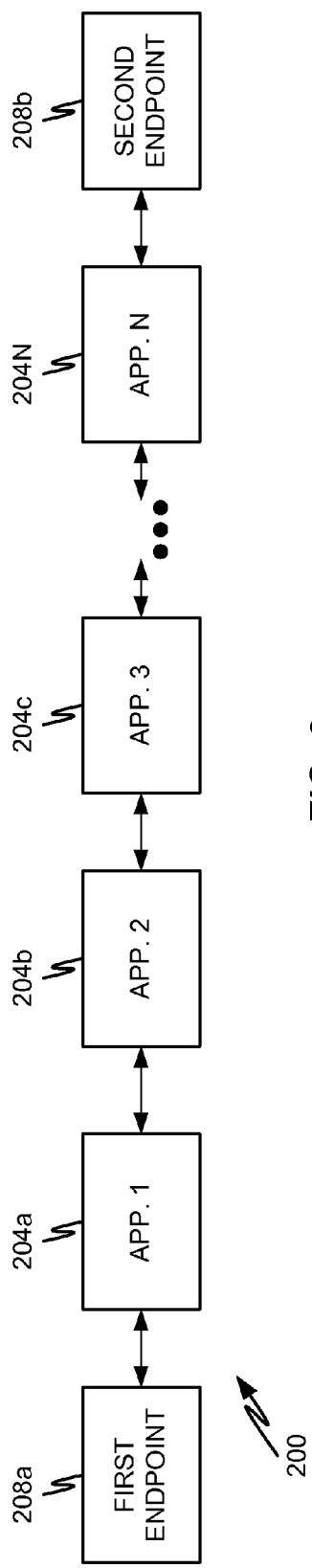
FIG. 2 is a block diagram of a first application sequence in accordance with embodiments of the present disclosure.
Figure 3:
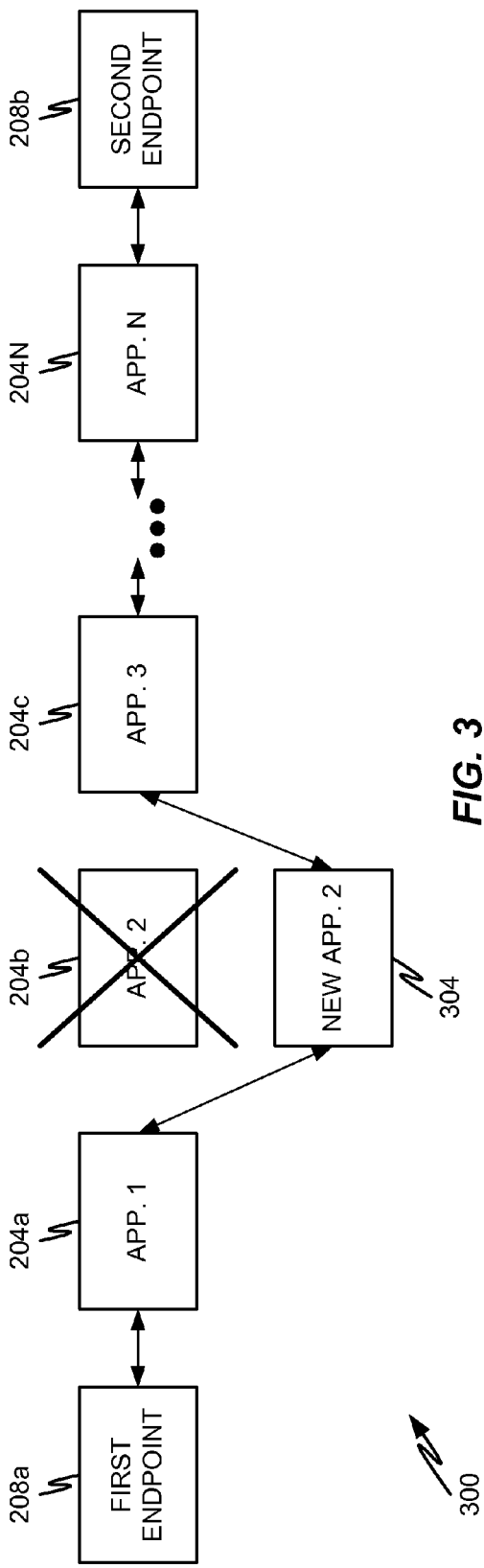
FIG. 3 is a block diagram of the first application sequence after reconstruction in accordance with embodiments of the present disclosure.

With reference now to FIGS. 2 and 3, a first application sequence 200 and a reconstruction thereof 300 will be described in accordance with at least some embodiments of the present disclosure. The first application sequence 200 may be established for a communication session with or without the help of feature sequencing functionality (e.g., as provided by communication server 124). The first application sequence 200 shows that control signaling for a communication session between a first endpoint 208*a* and a second endpoint 208*b* may traverse a plurality of applications 204*a*-N. Although the first application sequence 200 is only depicted in connection with a two-party communication session, it should be appreciated that concepts described herein are applicable to and can be implemented in connection with communication sessions involving three, four, five, six, . . . , one hundred, or more participants. Furthermore, a communication session may have multiple different application sequences associated therewith (e.g., different sequences for different participants).

Each endpoint 208a, 208b may correspond to either an external communication device 112 or an internal communication device 132. Likewise, the applications 204a-N may correspond to a single instance of an application 136, 140. In the simplest embodiment, the application sequence may comprise only a single application 204a that is sequenced between the endpoints 208a and 208b. The number of applications, N, that may be included in an application sequence may be anywhere between 1 and a very large number (e.g., 10, 100, 1000, etc.). There may be limitations on the highest value of N based on implementation constraints, but theoretically the value of N has no upper limit.

In the example of FIGS. 2 and 3, after the application sequence has been established and a communication session is in progress, an originally-sequenced application instance (e.g., second application 204b) may fail or otherwise become unreachable (e.g., due to network/connectivity failure) to its neighboring applications (e.g., first application 204a and third application 204c) and/or neighboring endpoints 208a, 208b. When an application failure is detected, embodiments of the present disclosure provide mechanisms for reconstructing the application sequence with a replacement application 304 rather than tearing down the already-established application sequence and re-building an application from scratch. In some embodiments, the neighbors to the failed application may detect the failure of the application and each neighbor may send one or more re-establishment messages to replacement application 304.

Under normal circumstances and according to SIP standards, the replacement application 304 would reject requests to join an application sequence for an in-progress communication session. However, if the replacement application 304 receives a re-establishment message from one and/or both neighboring applications in accordance with embodiments described herein, then the replacement application 304 will accept the message(s) and insert itself into the first application sequence to create a reconstructed first application sequence 300. This can be done while the communication session is in progress and without requiring the dialog to be torn down for the entire application sequence.

In some embodiments, the replacement application 304 may provide similar or identical services to those provided by the failed application (e.g., second application 204b). The replacement application 304 and failed application 204b may belong to a common application cluster and may be associated with a common domain name or address.

Figure 4:
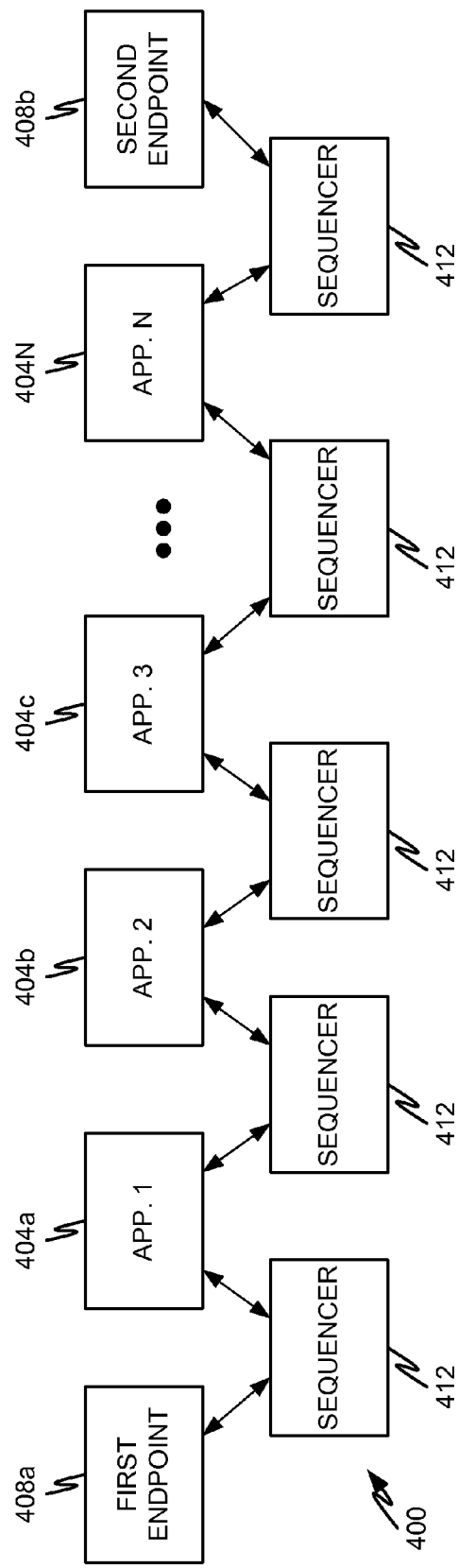
FIG. 4 is a block diagram of a second application sequence in accordance with embodiments of the present disclosure.
Figure 5:
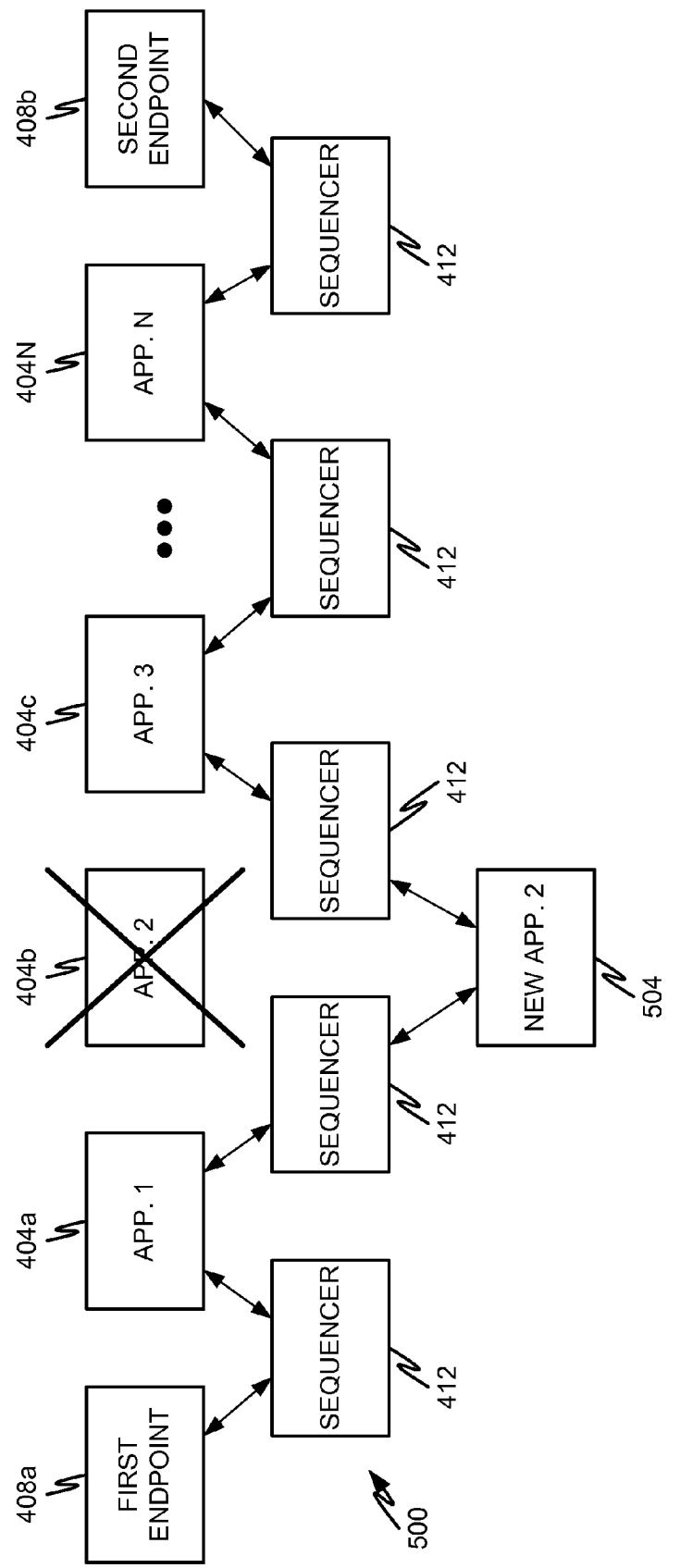
FIG. 5 is a block diagram of the second application sequence after reconstruction in accordance with embodiments of the present disclosure.

FIGS. 4 and 5 depict another example application sequence 400 and a reconstructed version of that application sequence 500. The main difference between the application sequences 200, 300 of FIGS. 2 and 3 and the application sequences 400, 500 of FIGS. 4 and 5 is that a sequencer 412 is part of the application sequence, which means that dialog/control signaling for the communication session between the endpoints 408a, 408b not only pass through the sequenced applications 404a-N, but it also passes through the sequencer 412 one or more times. In some embodiments, a sequencer 412 may be provided between each application 404a-N in the application sequence, although this is not a requirement. Rather, an application sequence may be a combination of the sequences 200 and 400 where a sequencer 412 is between some applications but not between all applications. Furthermore, the same instance of the sequencer 412 may not necessarily be between each neighboring application. Rather, different instances of a sequencer 412 may be provided between different applications.

In some embodiments, the sequencer 412 may include one or more instances of the communication server 124. The communication server 124 may operate to sequence each application 404a-N into the application sequence during establishment of the communication session and the communication server 124 may remain in the signaling path of the application sequence for the duration of the communication session.

Accordingly, the failure of an application (e.g., second application 404b) in this embodiment may either be detected by a neighboring application (e.g., first application 404a or third application 404c) or by an instance of the sequencer 412. Upon detecting the failure of the application, either the feature sequencer 412 and/or one or both neighboring applications 404a, 404c may send a re-establishment message to a replacement application 504. There are many ways that the re-establishment message can be transmitted. One is by using bulk replacement messages. That is, the re-establishing entity or the replacement application 504 obtains information about all affected SIP dialogs at once. Another possibility is for the replacement application 504 to query its neighbors on an as-needed basis. That is, when a re-establishment request from the upstream neighboring application arrives at the replacement application 504, the replacement application 504 queries the corresponding downstream application to re-construct the dialog. Yet another possibility is for the replacement application 504 to send out requests to its neighboring applications directly by first querying for the identity of its neighbors from the feature sequencer 412. Once the identity of its neighbors has been obtained, the replacement application 504 can send out the appropriate requests to the neighboring applications directly.

Similar to the example described in connection with FIGS. 2 and 3, the replacement application 504 may provide similar or identical services to those provided by the failed application (e.g., second application 404b). The replacement application 504 and failed application 404b may belong to a common application cluster and may be associated with a common domain name or address.

Figure 6:
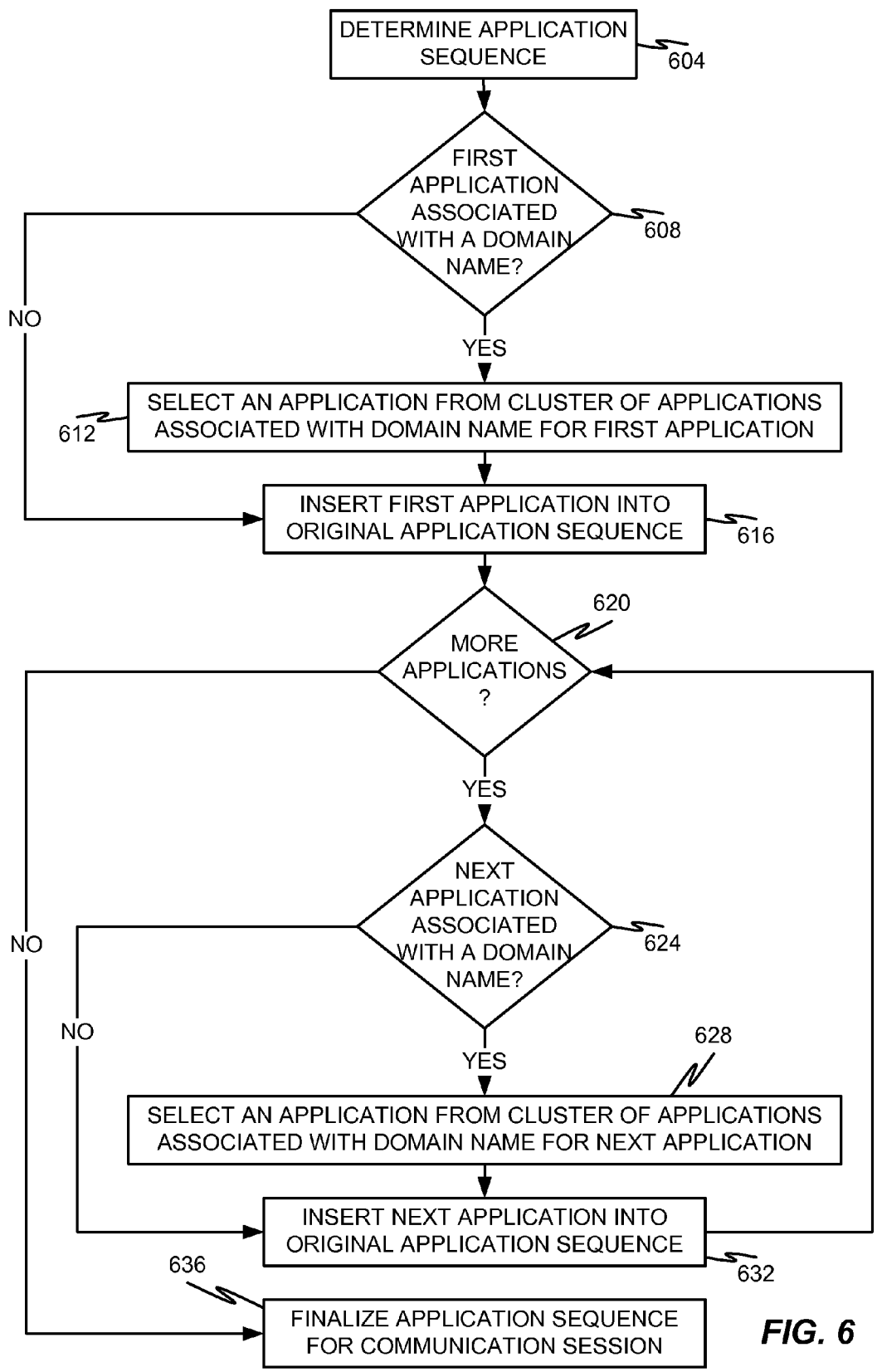
FIG. 6 is a flow diagram depicting a method of initially constructing an application sequence in accordance with embodiments of the present disclosure.

With reference now to FIG. 6, a method of initiating an application sequence at the beginning of a communication session will be described in accordance with at least some embodiments of the present disclosure. The method is initiated when a communication server 124 or feature sequencer 412 determines an application sequence that will be used for the communication session between two or more session participants (step 604). In some embodiments, the application sequence may be determined, at least in part, based on information contained in the user communication preferences 128. Furthermore, the application sequence may be determined in its entirety prior to a single application being integrated into the application sequence or the application sequence may be determined incrementally after each application in the sequence is integrated into the application sequence.

The method continues by determining whether the first application in the application sequence is associated with a domain name or a similar common address that resolves to multiple applications (e.g., in an application cluster) (step 608). If this query is answered affirmatively, then the communication server 124 or feature sequencer 412 will select an application from the application cluster as the first application for the application sequence (step 612). Thereafter, or in the event that the query of step 608 is answered negatively, the method proceeds to step 616 where the first application is inserted into the original application sequence for the communication session. As can be appreciated, the insertion of the first application into the application sequence may or may not be facilitated by a communication server 124 or feature sequencer 412. Rather, it may be possible that the calling user's communication endpoint knows the communication preferences of the user and the application sequence for the user may be determined at the endpoint rather than at a server.

Once the first application has been inserted into the application sequence (e.g., by providing the first application with a session-establishment message, such as an INVITE message which may or may not include Session Description Protocol (SDP) information for the calling user's communication endpoint), the method continues with the communication server 124, feature sequencer 412, or other device determining if more applications are to be included in the original application sequence (step 620).

If the query of step 620 is answered negatively, then the method will continue with the application sequence being finalized and the session-establishment message is transmitted to the called user's communication endpoint (step 636). The finalization of the application sequence may also involve receiving additional session-establishment messages (e.g., any additional SIP messages) at the application servers in the application sequence that are exchanged between the endpoints as part of establishing the media path between the communication endpoints. Examples of such additional messages include, without limitation, ACK messages, 200 OK messages, and so on. These additional session-establishment messages may further include SDP information for the called user's endpoint.

Referring back to step 620, if the query is answered affirmatively, then the method continues by determining whether the next application in the application sequence is associated with a domain name (or other type of common logical address) or is otherwise going to be selected as one of a plurality of applications that are capable of providing a common service (step 624). If so, then the next application is selected from the application cluster that is associated with the common logical address (step 628) and is inserted into the application sequence (step 632). If not, then step 628 may be skipped.

After step 628, the method returns back to step 620 and the loop of steps 620, 624, 628, and 632 is repeated until no further applications are needed for the application sequence.

Figure 7:
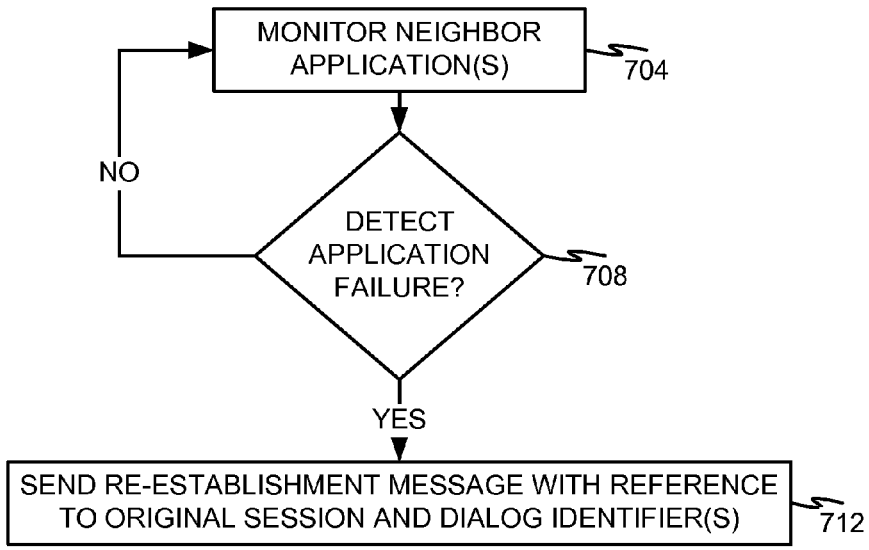
FIG. 7 is a flow diagram depicting a method of monitoring application health during a communication session in accordance with embodiments of the present disclosure.

With reference now to FIG. 7, a method of monitoring application health during a communication session in accordance with embodiments of the present disclosure. Specifically, any application that is included in an application sequence for a communication session may be subject to or perform steps described in FIG. 7.

The method begins with an application in the application sequence monitoring one or both of its neighbor applications (step 704). In some embodiments, rather than one application monitoring another application, the communication server 124 or feature sequencer 412 may be responsible for monitoring application health. It should be appreciated that any form of server or service monitoring technique may be employed. For instance, the act of monitoring an application in an application sequence may simply involve one application sending a message to another application and unless an appropriate response is received within a predetermined amount of time (or unless a rejection message is received), the application that sent the message can continue to assume that its neighboring application is still functional. As another example, the use of keep-alive messages may be utilized to determine whether one or more applications in an application sequence are still alive during a communication session. In other words, the specific way in which applications are monitored can vary without departing from the scope of the present disclosure.

The method continues with the monitoring entity (e.g., application, communication server 124, feature sequencer 412, etc.) determining whether a failure of the monitored application has been detected (step 708). If not, the method returns to step 704. If so, then the monitoring entity will send a re-establishment message to either the failed application or to a replacement application for the failed application (step 712). In some embodiments, the replacement application may be associated with the same address as the failed application and the replacement application may provide the same communication services as the failed application. Moreover, the re-establishment message may comprise information that will allow the replacement application to accept the message even though the replacement application was not initially included in the application sequence. More specifically, the re-establishment message may comprise information that references the original session by an identifier of the session (e.g., a P-charging vector, a global session identifier, a simple session identifier, a route set, an endpoint view header, combinations thereof, or the like) and/or by an identifier of the dialog that was originally established for the communication session.

Figure 8:
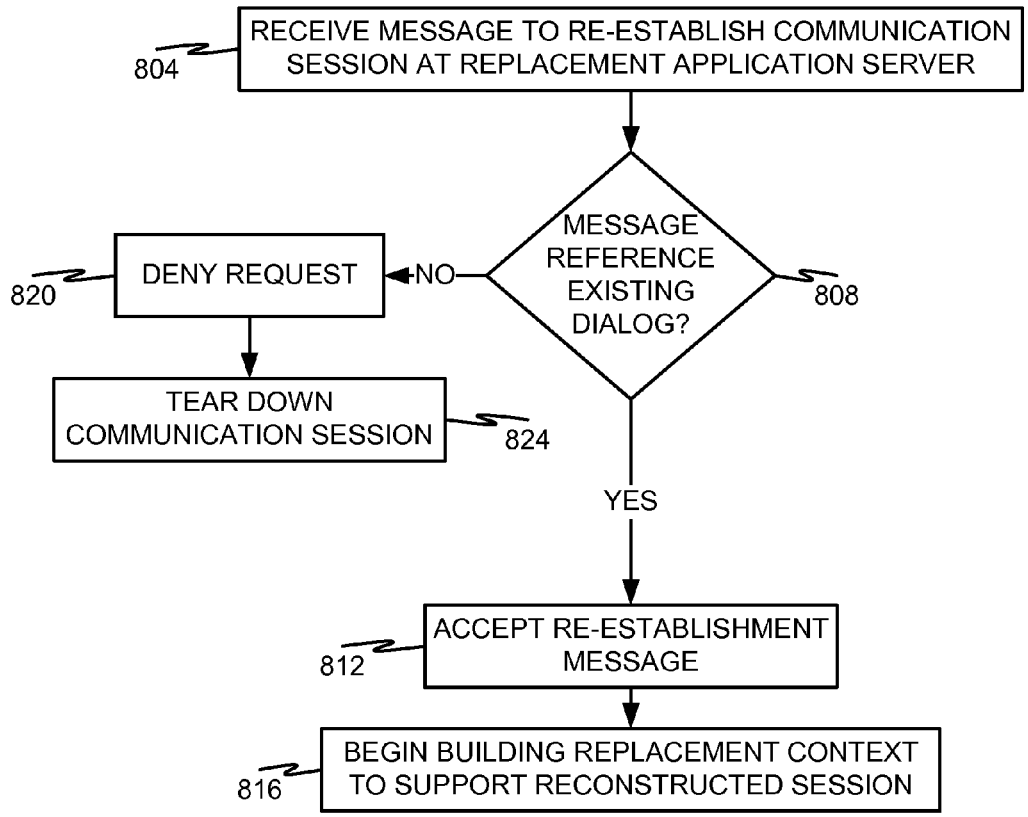
FIG. 8 is a flow diagram depicting a method of reconstructing an application sequence during a communication session in accordance with embodiments of the present disclosure.

With reference now to FIG. 8, a method of reconstructing an application sequence in response to an application failure will be described in accordance with embodiments of the present disclosure. The method is initiated when a message is received at an application server that includes instructions to re-establish an application sequence for an in-progress communication session (step 804). In some embodiments, the re-establishment message may be received at a replacement application that is within the same application cluster as the application that was previously in the application sequence but has since failed.

Upon receiving the re-establishment message, the replacement application may analyze the message to determine if it properly references an existing dialog and/or communication session (step 808). This query step may also be depending upon the replacement application receiving suitable re-establishment messages from two or more applications (e.g., an upstream neighbor application and a downstream neighbor application). Thus, the response to the query of step 808 may involve a more complicated process of waiting for multiple re-establishment messages, comparing the identifiers of each message, and determining whether each of the re-establishment messages are referencing the same in progress communication session/dialog.

If the query of step 808 is answered affirmatively, then the replacement application will accept the re-establishment message(s) (step 812) and insert itself into the application sequence that is already established and is still supporting the in-progress communication session (step 816). Specifically, as long as the re-establishment message(s) come from the appropriate entities (e.g., one or both neighboring applications, endpoints, sequencers, etc.) and properly reference the communication session or its dialog, the replacement application will begin acting in a similar fashion to the previous application that failed and is no longer included in the application sequence.

In accordance with at least some embodiments of the present disclosure, the replacement application may not necessarily require a complete context (e.g., state information) for the communication session. Rather, the replacement application can simply begin building a replacement context to support the reconstructed session and the reconstructed application sequence. As an example, if the failed application and the replacement application correspond to a call recording application, it may not be desirable or possible for the replacement application to obtain the data that was recorded at the original application prior to its failure. Rather, the replacement application can simply begin recording the communication session from the point-in-time that it is inserted into the application sequence. This still has the advantage of not completely tearing down the entire application sequence, which may result in the communication session being lost or dropped.

In some embodiments, however, it may be possible to put the replacement application into a learning mode whereby after it is inserted into the application sequence, the replacement application can learn certain state information from its peer applications (e.g., other applications currently in the application sequence). Utilization of a learning mode may enable the replacement application to determine some state information as a part of building the replacement context.

Referring back to step 808, if the re-establishment message(s) received at the replacement application do not properly reference an existing dialog and/or communication session, then the replacement application may deny the request (step 820) in accordance with SIP standards. This may also result in the application sequence and/or communication session being entirely torn down (step 824).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
determining, by a processor, that an application in an application sequence has failed during a communication session that is associated with the application sequence;
sending, by the processor, a re-establishment message to a replacement application, the re-establishment message referencing an identifier of at least one of the communication session and its dialog; and
reconstructing, by the processor, the application sequence for the communication session while the communication session is still in progress so that the reconstructed application sequence includes the replacement application.

2. The method of claim 1, further comprising:
removing the failed application from the application sequence so that it is not included in the reconstructed application sequence; and
replacing the failed application with the replacement application in the reconstructed application sequence.

3. The method of claim 2, wherein the failed application and replacement application resolve to a common logical address.

4. The method of claim 1, wherein the application sequence comprises a plurality of different applications that provide different call services for the communication session.

5. The method of claim 1, wherein the application sequence is reconstructed without requiring the application sequence to be torn down.

6. The method of claim 1, wherein the re-establishment message comprises a SIP message that references at least one of a route set, a global session identifier, and a P-charging vector of the communication session.

7. A non-transitory computer-readable medium comprising processor-executable instructions that, when executed by a processor, perform the method of claim 1.

8. A communication system, comprising:
a plurality of applications in an application sequence, executed by a processor, each of the plurality of applications providing one or more call services in connection with a communication session that is established between at least a first and second communication device; and
a replacement application, executed by the processor, that receives a re-establishment message from at least one entity that neighbors a first application in the application sequence that has failed during the communication session and, in response to receiving the re-establishment message, inserts itself into the application sequence for the communication session while the communication session is still in progress so that the reconstructed application sequence includes the replacement application.

9. The communication system of claim 8, wherein the re-establishment message references an identifier of at least one of the communication session and its dialog.

10. The communication system of claim 9, wherein the reconstructed application sequence does not include the first application and wherein the replacement application replaces the first application.

11. The communication system of claim 10, wherein the first application and the replacement application resolve to a common logical address.

12. The communication system of claim 8, wherein the re-establishment message comprises a SIP message that references at least one of a route set, a global session identifier, and a P-charging vector of the communication session.

13. The communication system of claim 8, wherein the application sequence is reconstructed without requiring the application sequence to be torn down.

14. The communication system of claim 8, wherein the replacement application is configured to insert itself into the application sequence only after at least two re-establishment messages have been received from at least two different entities in the application sequence.

15. The communication system of claim 8, wherein the at least one entity that neighbors the first application comprises a Back-to-Back User Agent.

16. The communication system of claim 8, wherein the at least one entity that neighbors the first application comprises a feature sequencer.

17. A SIP-compliant communication component, executed by a processor that is incorporated into an application sequence during a communication session as a replacement application for a failed application that was previously incorporated in the application sequence prior to its failure, wherein the SIP-compliant communication component is configured to insert itself into the application sequence in response to receiving a re-establishment message from at least one entity that neighbors the failed application.

18. The communication component of claim 17, wherein the at least one entity that neighbors the failed application comprises at least one of a Back-to-Back User Agent and a feature sequencer.

19. The communication component of claim 17, wherein the re-establishment message references an identifier of at least one of the communication session and its dialog.

20. The communication component of claim 17, wherein the communication component resolves to a common logical address and wherein the failed application also resolves to the common logical address.

* * * * *